Feb. 13, 1934.  H. LAUB  1,947,268
ELECTRICAL DISTRIBUTION
Filed May 28, 1932
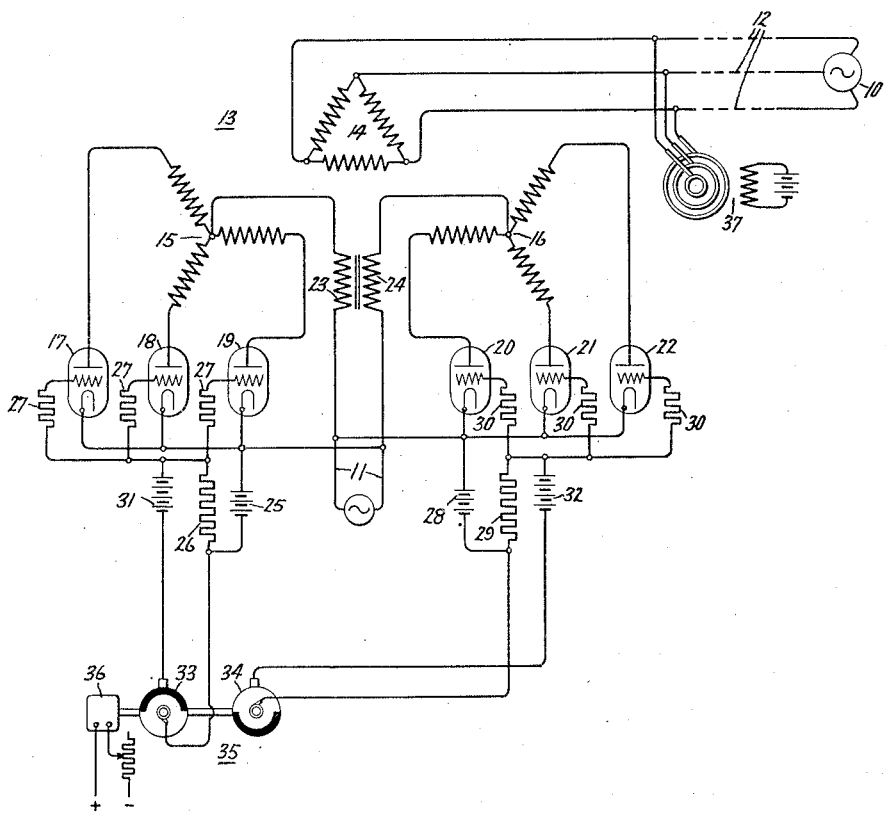
Inventor:
Hans Laub,
by Charles E. Mullan
His Attorney.

Patented Feb. 13, 1934

1,947,268

UNITED STATES PATENT OFFICE 1,947,268

ELECTRICAL DISTRIBUTION

Hans Laub, Berlin-Wilmersdorf, Germany, assignor to General Electric Company, a corporation of New York Application May 28, 1932, Serial No. 614,207, and in Germany June 13, 1931

3 Claims. (Cl. 172—281)

My invention relates to systems of electrical distribution and more particularly to such systems adapted to transmit energy between a substantially steady power circuit and a single phase alternating current circuit. While my invention is of general application, it is particularly useful in connection with the transmission of power between single phase and polyphase alternating current circuits by means of electric valve frequency changers.

Heretofore there have been proposed numerous arrangements for transmitting energy between direct and alternating current circuits or between independent alternating current circuits of the same or different frequencies. The use of electric valve converting apparatus for this purpose is particularly advantageous since, by means of such apparatus, the magnitude and direction of the transmission of power between the two circuits may be readily controlled. When transmitting energy between single phase and direct current or polyphase alternating current circuits, however, some difficulty has been experienced due to the fact that power delivered by or consumed by a single phase alternating current circuit is inherently pulsating in its nature, while, for optimum operating conditions on the direct current or polyphase circuit, it is essential that the flow of power be substantially steady. When energy is exchanged between two alternating current systems by means of rotating dynamo electric machines, the inertia of the rotating masses is effective to absorb and release the momentary differences between the pulsating power of the single phase system and the steady power of the polyphase system. In the use of electric valve frequency changers, however, and other similar static equipment, the system is substantially inertialess; that is, there is no energy storage element for absorbing and releasing these momentary differences in power.

It is an object of my invention, therefore, to provide an improved system of electrical distribution which will overcome the above mentioned disadvantages of the arrangements of the prior art and which will be simple and reliable in operation.

It is another object of my invention to provide an improved system of electrical distribution including a substantially inertialess apparatus for transmitting energy between single phase and polyphase alternating current circuits in which the flow of power in the polyphase circuit may be maintained substantially steady.

It is a further object of my invention to provide an improved system of electrical distribution including substantially inertialess converting apparatus for transmitting energy between single phase and polyphase alternating current circuits and means for absorbing and releasing instantaneous differences between the average power transmitted by the apparatus and the pulsating power of the single phase system.

In accordance with one embodiment of my invention, a polyphase alternating current generating station is adapted to supply energy to a variable frequency single phase alternating current receiving circuit remote from the generating station by means of a polyphase transmission circuit, a polyphase receiving station remote from the generating station and adjacent to the single phase receiving circuit, and an electric valve frequency changing apparatus interconnecting the polyphase receiving circuit and the single phase receiving circuit. In order to compensate for the instantaneous differences between the pulsating power characteristic of the single phase circuit and the substantially steady power which it is desired to maintain on the polyphase circuit, a synchronous condenser having considerable inertia is connected to the polyphase circuit immediately adjacent the electric valve converting apparatus.

For a better understanding of my invention, together with other and further objects thereof, reference is had to the following description taken in connection with the accompanying drawing and its scope will be pointed out in the appended claims. The single figure of the accompanying drawing illustrates my invention as applied to a system for transmitting energy from a polyphase generating station to a remote single phase receiving circuit.

Referring now to the drawing, I have illustrated a system of distribution for transmitting energy from a polyphase alternating current generating station 10 to a variable frequency single phase alternating current receiving circuit 11 remote from the generating station. A polyphase transmission circuit 12 interconnects the generating station 10 with a receiving station including an electric valve frequency changing apparatus 13. This electric valve frequency changing apparatus per se forms no part of my present invention and may be of any of the several types well known in the art, although I have illustrated by way of example, a converting apparatus similar to that disclosed in United States Letters Patent No. 1,408,118, granted February 28, 1922, upon the application of F. W. Meyer. This apparatus comprises a polyphase transformer having a primary winding 14 connected to the alternating current circuit 12, and a pair of three phase secondary windings 15 and 16, which, with their associated groups of electric valves 17, 18 and 19, and 20, 21 and 22, respectively, comprise three phase half wave rectifiers, the connections being such that the two rectifiers are adapted to supply unidirectional current of opposite polarity to the single phase alternating current circuit 11. Each of the several elecric valves 17–22, inc., is provided with an anode, a cathode, and a control grid and may be of any of the several types well known in the art, although I prefer to use valves of the vapor electric discharge type. The mutually coupled reactance devices 23 and 24 are preferably included in the two rectifier circuits to aid in the transfer of current between them. The grids of the electric valves 17, 18, and 19 are connected to their respective cathode circuits through a negative bias battery 25, a biasing resistor 26 and current limiting resistors 27. Similarly, the grids of the electric valves 20, 21, and 22 are connected to their common cathode circuit through a negative bias battery 28, a biasing resistor 29 and current limiting resistors 30. The bias batteries 25 and 28 tend to maintain the several electric valves nonconducting. In order periodically to overcome the bias on the groups of valves included in the two rectifiers, the bias resistors 26 and 29 are energized from positive bias batteries 31 and 32 through the sections 33 and 34, respectively, of a distributor 35 driven by means of a variable speed motor 36. In the polyphase alternating current receiving station including the valve converting apparatus, there is also included a polyphase synchronous condenser 37 connected to the alternating current circuit 12 immediately adjacent the converting apparatus.

The operation of the above described electric valve converting apparatus will be well understood by those skilled in the art or may be found explained in more detail in the above mentioned Meyer patent. In brief, assuming the distributor 35 to be in the position illustrated, the negative bias of the battery 28 is overcome by the positive bias of the battery 32 impressed across the resistor 29, through the section 34 of the distributor, thus rendering conductive the group of valves 20–22, inc. These valves, together with the winding 16, operate as a rectifier to supply unidirectional current to the receiving circuit 11. During a succeeding interval of time when the distributor has rotated to such position that the circuit is broken at the section 34 and completed at the section 33, the valves 17, 18 and 19 will be rendered conductive to supply unidirectional current of an opposite polarity to the alternating current circuit 11. By adjusting the speed of the motor 36, the distributor 35 is effective to transfer the current between the rectifiers at any desired frequency, thus supplying alternating current to the circuit 11. In case one group of electric valves is made conductive while the other is still conducting current, a short circuit current may tend to build up in the apparatus. This tendency may be avoided, however, by the mutually coupled reactance devices 23 and 24, by means of which the building up of current in one of the rectifier circuits induces a counter voltage in the other circuit effective to interrupt the current in that circuit. As stated above, the alternating current circuit 11 inherently draws a pulsating power having a wave form which is approximately a sine-square wave. However, if such pulsating power is drawn from the generating station 10 over the transmission circuit 12, the stability of the system is impaired and its other operating characteristics disadvantageously affected. By connecting the synchronous condenser to the alternating current circuit 12 immediately adjacent the converting apparatus, however, and by giving the condenser 37 considerable rotating mass, it is effective to absorb and release the momentary differences between the pulsating power taken by the single phase circuit 11 and the substantially steady power which it is desired to transmit over the circuit 12, thus substantially improving the operation of the system as a whole.

While I have described that I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A system of electrical distribution comprising a substantially steady power circuit, a single phase alternating current circuit, substantially inertialess converting apparatus for transmitting energy between said circuits, and a dynamo electric machine connected to one of said circuits immediately adjacent said converting apparatus for absorbing and releasing instantaneous differences between the average power transmitted by said converting apparatus and the pulsating power of said single phase system.

2. A system of electrical distribution comprising a polyphase alternating current generating station, a polyphase alternating current receiving circuit remote therefrom, a transmission circuit interconnecting said station, and said receiving circuit, a single phase alternating current circuit, substantially inertialess converting apparatus for transmitting energy between said single phase circuit and said receiving circuit, and a dynamo electric machine connected to said receiving circuit immediately adjacent said converting apparatus for absorbing and releasing instantaneous differences between the average power transmitted by said converting apparatus and the pulsating power of said single phase system.

3. A system of electrical distribution comprising a polyphase alternating current circuit, a single phase alternating current circuit, electric valve frequency changing apparatus for transmitting energy between said circuits, and a synchronous condenser connected to said polyphase circuit immediately adjacent said frequency changing apparatus for absorbing and releasing instantaneous differences between the average power transmitted by said converting apparatus and the pulsating power of said single phase system.

HANS LAUB.